United States Patent [19]

Kobayashi et al.

[11] Patent Number: 5,296,523
[45] Date of Patent: Mar. 22, 1994

[54] INORGANIC COLORANT, COLORANT-DISPERSED PASTE, AND PAINT CONTAINING THE SAME

[75] Inventors: Toshikatsu Kobayashi, Kyoto; Kenji Kouguchi; Hiroyuki Kageyama, both of Osaka, all of Japan

[73] Assignee: Nippon Paint Co., Ltd., Osaka, Japan

[21] Appl. No.: 834,402

[22] Filed: Feb. 12, 1992

Related U.S. Application Data

[63] Continuation-in-part of Ser. No. 524,889, May 18, 1990, abandoned.

[30] Foreign Application Priority Data

May 22, 1989 [JP] Japan ................................. 1-128240

[51] Int. Cl.$^5$ .............................................. C08K 9/00
[52] U.S. Cl. .................................... 523/200; 524/431; 524/432; 524/441; 204/165; 427/213; 427/488
[58] Field of Search .................. 523/200; 204/165; 427/41, 213, 488; 524/431, 432, 441

[56] References Cited

U.S. PATENT DOCUMENTS

| | | | |
|---|---|---|---|
| 4,349,389 | 9/1982 | Schofield | 106/388 Q |
| 4,478,643 | 10/1984 | Kuwahara et al. | 106/288 Q |
| 4,632,961 | 12/1986 | Tsutsui et al. | 525/162 |
| 4,810,524 | 3/1989 | Nakayama et al. | 427/38 |

*Primary Examiner*—Paul R. Michl
*Assistant Examiner*—John J. Guarriello
*Attorney, Agent, or Firm*—Nikaido, Marmelstein, Murray & Oram

[57] ABSTRACT

This invention relates to an inorganic colorant, to a paste made from that colorant by dispersing that colorant into a vehicle, and to a water based paint made using either these colorants or pastes. This invention involves an improvement of the dispersibility of the inorganic colorant into a dispersion medium by which that inorganic colorant, having polar groups on its surface, is treated by low temperature plasma polymerization of a substantially non-polar monomer to form a non-polar group on the surface of the inorganic colorant. The inorganic colorants, to which this invention is applied to improve their dispersibility, are of a wide variety of species. According to the invention, due to the great improvement in the dispersibility of the inorganic colorants, the possible range of formulation of inorganic colorant and the dispersion medium is enlarged.

7 Claims, 1 Drawing Sheet

INORGANIC COLORANT, COLORANT-DISPERSED PASTE, AND PAINT CONTAINING THE SAME

This application is a continuation-in-part of Ser. No. 524,889, filed on May 18, 1990, now abandoned.

BACKGROUND OF THE INVENTION

The present invention relates to inorganic colorants, pastes containing such colorants dispersed therein, and paints containing the colorants and/or the pastes. In more detail, this invention relates to inorganic colorants which are useful for producing coloring coatings etc.; pastes, in which the colorants are dispersed beforehand, which are used in the production of paints etc.; and paints produced from the inorganic colorants and the pastes in which the colorants are dispersed.

As paints, there are so-called oil-based paints, which contain one or more organic solvents; water-based paints, wherein water is used instead of the organic solvent; and powder paints, in which a solvent is not used. Since the oil-based paints involve the use of an organic solvent which is harmful and volatile, there is a potential problem of pollution occurrence, such as air pollution, and there is the possibility of injury to the health of workers where the coating is being made or where it is being applied. Therefore, water-based paints and powder paints are in developing use.

In formulating a paint, usually one or more powdered colorant is ground in a vehicle of a dispersion medium, which comprises suitable resins, solvents and so on, to produce a so-called paste in which colorants are substantially uniformly dispersed, and then resins, solvents, and various kinds of additives are further added to the paste, if necessary.

Both organic and inorganic colorants have been used as the raw materials for paints. While the organic colorants are superior in color clarity, the inorganic colorants show high stability and are superior in heat-resistance, hiding power, and weather-resistance. Therefore, inorganic colorants are more often chosen for those uses in which durability is necessary.

From the standpoint of efficiency of production, a paste which contains a colorant in high concentration is at first prepared by using various types of dispersing means, and this paste is then diluted with a solution of a resin, which is selected depending upon the potential use, to get a paint. In this process, it is very important to disperse the colorant particles in a fine, stable condition and, for this, the colorant particles must have a good affinity for the resin molecules which comprise the paste. It is also important for the adsorbed resin to prevent flocculation of the dispersed colorant particles (that is to stabilize the colorantdispersion) by formation of an adsorbed resin layer on the colorant particle surface. Furthermore, paints and paint films have to possess and achieve certain performance criteria, such as gloss, hiding power, stability against settling, flooding, floating, and so on. In order to enhance these kinds of performance, fine dispersion of the colorant is necessary. Dispersibility of the colorant in the paint is improved as the affinity between the colorant and the vehicle increases, and the affinity between the colorant and vehicle is affected by the surface properties of the colorant.

The vehicle in which the colorant is dispersed is usually composed of resins as aforementioned. In the case where the resin molecule has an acidic functional group, such as a carboxyl group or a sulfonic acid group; or a basic functional group, such as a primary, secondary, or tertiary amino group, or an imino group, the resin molecule adsorbs the colorant by an acid-base interaction. Dispersion stability is therefore achieved when a basic functional group or an acidic functional group, respectively, is suitably introduced into the colorant.

In this connection, among the known methods which improve the affinity between the colorants and the resins, is the art wherein amphoteric resins are used to enhance the acid-base interaction between resins and colorants, see published U.S. Pat. No. 4,632,961 (Japanese Official Patent Provisional Publication, Showa 58-21,468), and the technology wherein acidity and/or basicity is imparted to colorants by plasma-treating to enhance the acid-base interaction between resins and colorants, see published U.S. Pat. No. 4,478,643 (Japanese Official Patent Provisional Publication, Showa 58-217,559).

In the series of water-soluble resin paints, the acidic or basic functional group has been consumed (neutralized) when the resin was dissolved into a solvent (water). It is generally difficult to utilize the acid-base interaction for the adsorption of the resin on the colorant.

In this series of paints, adsorption of the resin on the colorant is attained by hydrophobic interaction so that the free energy at the interface between the colorant and the resin is smaller than the free energy at the interface between the colorant and water. Since the inherent molecular skeleton of water soluble resins have low polarity, and organic colorants and carbon black have low polarity on their surfaces, the free energy at the interface between the colorant and the resin is small, and absorption of the colorant by the resin proceeds easily.

However, most inorganic colorants are composed of metal oxides, such as $TiO_2$, $ZnO$, $SiO_2$, $Al^2O_3$, $Fe_2O$, $FeO$, and $Fe_2O_3$, or of metals, such as Al, Cu, and Zn. Many hydroxy groups are formed on the surface of these colorants by the chemical or physical adsorption of water, which exists as humidity in the air. Because of this, the surface of inorganic colorants generally have high polarity and, for example when the polarity is indicated by the heat of immersion in water, the organic colorants, such as phthalocyanine blue and quinacridone red, and carbon black, show a polarity of about 0.1 $J/m^2$ or less, whereas the polarity of the inorganic colorants, measured in the same way, are about 0.25 $J/m^2$ or more. Thus, the inorganic colorant surface has a high polarity, so that the free energy at the interface between the colorant and the resin is large. A relatively unstable interface results, and resin adsorption does not readily proceed. Therefore, in order to increase the affinity between inorganic colorants, having such an inherently polar surface as above, and resins which have relatively lower polarity, the polarity of the surface of the inorganic colorant must be lowered. That is, in the series of water-soluble resin paints, since dispersion stability is mainly attained with the resin adsorption resulting from the hydrophobic interaction between the resin and the colorant (T. Kobayashi, T. Terada, and S. Ikeda, J. Japan Society of Colour Material, 62, 524 (1989)), the colorant surface has to be hydrophobic (low polarity) and thus, it is necessary to decrease polarity of the inorganic colorant surface.

Regarding the modification of the colorant surface, the following methods are exemplary of methods which have been recently been proposed:

as a wet method:
(1) treating the colorant surface with a silane coupling agent, or
(2) treating the colorant surface with an aliphatic alcohol and a fatty acid, etc. at elevated temperature: and as a dry method:
(3) vapor phase fluorination using a high temperature flow reactor (published in the Bulletin of the Chemical Society of Japan, 60, 2833 (1987)), or
(4) polymerization of a cyclic silicone compound on the surface of a colorant (published in the proceedings of the Annual Meeting of the Japan Society of Colour Material, 1986, 1B-10).

In the said hitherto known methods for treating the surface of colorants, there has been some difficulty in selection of the treating conditions. Further, the cost of treatment is high. In method (2), the treatment is sometimes not possible the chemical properties of the surfaces of colorants. For example, surface treatment with an aliphatic alcohol is limited to those situations where the surfaces of the colorants are neutral or weakly acidic. In addition, if such treated colorants are used under aqueous conditions, the treated layer may be removed from the surface of the colorants by hydrolysis and, therefore, these colorants cannot be used in a water-based paint.

Method (3) needs to use such a high temperature, about 700°-800° C., for its reaction, that the hue sometimes changes due to exposure to such high temperature. As for method (4), applicable colorants and vehicles cannot be freely chosen because a special silicone compound is used.

SUMMARY OF THE INVENTION

Thus, an object of the present invention is the provision of inorganic colorants whose dispersibility in conventional dispersing media of paints is excellent. The performance of the paints is improved by the use therein of such colorants. There is a wide range of vehicle and paint systems to which these colorants can be applied. These improved inorganic colorants are especially suitable for use in water-based paints and in oil-based paints in which a neutral or a non-polar resin is used. The instant invention also provides a paste using the improved inorganic colorants, which paste may later be used in paint or other formulations.

This invention further envisions improving the performance of paints, etc. by using said inorganic colorants. The range of vehicle and paint systems to which said colorants can be applied is wide. They are especially suitable for water-based paint and oilbased paint in which a neutral or a non-polar resin is used. Also, the subject of the present invention is to provide a paste suitable for use in a paint, incorporating said improved inorganic colorants.

According to this invention, the problems of the prior art are solved by subjecting a conventional inorganic colorant to a low temperature plasma polymerization of an organic compound. This process forms a non-polar surface on the surface of the inorganic colorant.

It has generally been known that such organic compounds as aromatic hydrocarbons and alicyclic compounds are capable of being formed, by exposure to a plasma, into polymers of low polarity composed of such hydrocarbons. It is also known that, if a fluorine-containing compound is used as said organic compound, the polymer formed in and by exposure to the plasma is of still lower polarity and contains fluorine (J. Polymer Science, Polym. Chem. Edit., 15, 2411 (1977)).

The plasma polymer is formed on the surface of the inorganic colorant by bringing the inorganic colorant into contact with a plasma atmosphere of one or more of the above mentioned organic compounds, or for that matter, substantially any other such substantially non-functional organic compounds. As a result, the inorganic colorant is wholly or partly covered with a coating film of said plasma polymer and the polarity of the inorganic colorant surface is thus lowered. According to the inventors' experiments, the heat of immersion in water decreases by treating conventional titanium dioxide pigment with a plasma of styrene from 0.28 $J/m^2$ to 0.19 $J/m^2$; and, after treating the same titanium dioxide with octafluorocyclobutane (perfluorocyclobutane), it was reduced to 0.13 $J/m^2$ (T. Kobayashi, H. Kageyama, and S. Ikeda; ACS Symposium on Plasma Polymerization and Plasma Interaction with Polymeric Materials, Proceedings, 1990).

The inorganic colorants to which the present invention is directed are exemplified by the usual inorganic compounds: such as titanium dioxide, zinc white, red iron oxide, yellow iron oxide, chrome yellow, ultramarine blue, aluminum powder, and mica powder, etc. The surfaces of these inorganic colorants inherently have polarity as aforesaid.

The organic compounds which have been found to be useful in the present invention are exemplified by: aromatic hydrocarbons, such as benzene, toluene, xylene, and styrene etc., cycloaliphatic compounds such as: cyclohexane, cyclobutane, and THF (tetrahydrofuran), etc., compounds which contains an element other than hydrogen and carbon, for example, a fluorine containing compound such as octafluorocyclobutane, and any other organic compound which is capable of forming non-polar groups on a surface of the inorganic colorant by plasma polymerization.

Plasma polymerization of substantially non-polar organic compounds is the method of choice to form non-polar groups on the surface of the inorganic colorant. Thus, when the low temperature plasma of said organic compound is brought into contact with a colorant in powdered form, non-polar groups are formed on the surface of the inorganic colorant. The whole surface of the inorganic colorant may be covered by the non-polar group, or a part of surface of the inorganic colorant may be covered by the material containing the non-polar group. At least, a sufficient proportion of the surface of the inorganic colorant should be coated with the material containing the non-polar groups so as to decrease the polarity thereof an amount which makes the coated inorganic compatible with the resin.

The low temperature plasma treatment is carried out using an apparatus and a method which are per se known and have previously been applied for polymerizing various kinds of materials. It is preferred to select an organic compound whose vapor pressure is 0.1 Torr (absolute) or more at room temperature. In addition, it is preferred to carry out the polymerization with a pressure of the plasma atmosphere of the organic compound of 0.1–10 Torr. It is more preferred to carry out the plasma polymerization at a pressure in the range of 0.5–3 Torr. It is preferred to carry out the polymerization under such conditions that the electric energy being imposed during the plasma treatment is 1 mwh/m² or more per unit of surface area of the inorganic colorant being subjected to treatment.

The coated inorganic colorant produced by the low temperature plasma polymerization process of this invention is dispersed in a suitable vehicle in a conventional manner by conventional means. As such, it can not only be used to prepare a paste for producing a paint, and to produce a paint therefrom, but it also can be used as a colorant for cosmetics, etc. Thus, it can be used for substantially any use by being dispersed in various kinds of dispersing media, similar to usual colorants, in the well know manner.

As a material to be used as a medium for dispersing the inorganic colorant according to the present invention, for example, as a vehicle for paint, and so on, it is preferred to use various kinds of water-soluble materials such as water-soluble acrylic resins, etc. The colorant-dispersed paste described herein is designed so as to be obtained by dispersing the colorant described herein into a vehicle.

The vehicle is composed of resins and, if necessary, of a suitable solvent and/or one or more additives. Additives and/or solvents which are similar to those which are conventionally used in conventional paint formulations may be used. Resins which are preferably well suited to use for this vehicle are exemplified by water-soluble resins as mentioned above. Methods and apparatus for dispersing an inorganic colorant in a vehicle are similar to those used in producing conventional paint.

The paints described herein are designed so as to contain the inorganic colorant described herein, or to contain the paste, in which the colorant is dispersed, as described herein, respectively. The paint is usually produced from the aforesaid pastes by further addition of other ingredients, such as a vehicle, a solvent, that may be an organic solvent or water, etc., and a plasticizer, a drying agent, a curing agent, a dispersing agent, and an emulsifier, etc. into the paste in which colorants are dispersed. Practical raw materials and a process for producing the products hereof are similar to those in the case of conventional paint. Alternatively, an inorganic colorant may directly be added without first dispersing such in a paste form. It is preferred to produce a water-based paint containing the surface modified inorganic colorant of the present invention, as described above. Such a water paint would preferably use a water-soluble resin.

For an inorganic colorant which has inherent substantial polarity on its surface, the formation of a non-polar group on the surface by the low temperature plasma polymerization of an organic compound according to this invention, causes the polarity of the surface of the inorganic colorant to at least be lowered or, preferably, the surface becomes completely non-polar.

When the surface of the inorganic colorant has its polarity lowered or becomes substantially completely non-polar, the affinity of surface for the non-polar vehicle of paints etc. is enhanced, and the dispersibility of the inorganic colorants is improved.

In particular, in a dispersion medium composed of a water-soluble resin and water, the resin is adsorbed on the colorant surface. It is believed that this absorption is through hydrophobic interaction between hydrophobic groups of the resin and non-polar groups of the colorant. Dispersibility and dispersion stability of the inorganic colorant is improved because the adsorbed resin prevents flocculation of dispersed colorants and keeps the colorant particles in a separated state.

DESCRIPTION OF THE INVENTION

Figure 1:
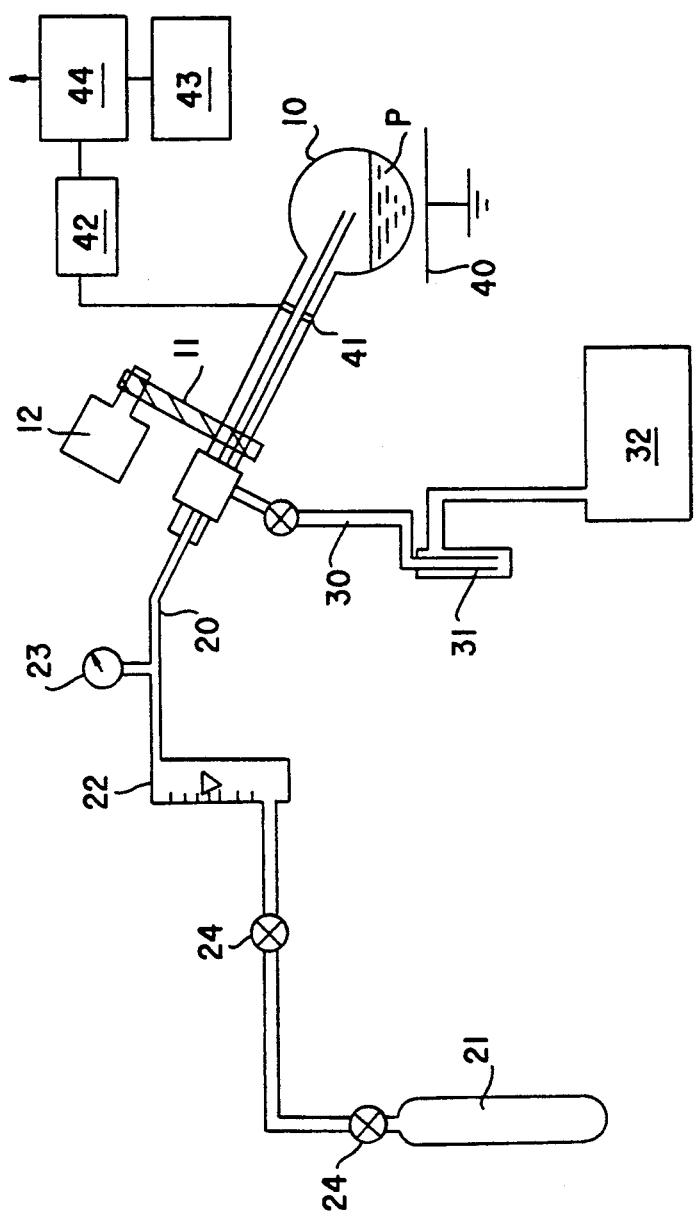
FIG. 1 shows an outline structure of a plasma-treatment apparatus for producing an inorganic colorant.

A flask shaped treatment vessel 10 has a volume of 500 ml and is connected at its neck with a driving motor 12 via a belt 11 for driving. It is designed so as to accommodate a material P, such as an inorganic powdered colorant, etc. and to carry out treatment with plasma under rotation and stirring conditions. The treatment vessel 10 is connected with a gas-supplying pipe 20, which is in turn connected to a gas cylinder 21 containing an organic compound. A gas flow meter 22 and a pressure gauge 23 or a valve 24 are disposed in the pipe 20. A vacuum, suction pump 32 is connected with the treatment vessel 10 via a trap 31. Thus, any gas in the treatment vessel 10 is removed by suction. A pair of electrodes 40 and 41 are disposed respectively at the neck and below the bottom part of the treatment vessel 10. One electrode 40 is grounded and the other electrode 41 is connected with a high frequency electric source 44 via an impedance matching circuit 42. A high-frequency generator 43 is connected with a commercial electric source and used for the high frequency electric source 44.

By using a treatment apparatus as described above, the low temperature plasma polymerization coating of an inorganic colorant is carried out according to this invention.

EXAMPLE 1

In the treatment vessel 10 of said treatment apparatus were placed 50 g of titanium dioxide [Tipaque (registered trademark) CR - 50 made by Ishihara Sangyo Co., Ltd.], and 50 g of a glass beads (GB 503M made by Toshiba Barotini Co., Ltd.). After degassing the treatment vessel to $10^{-1}$ Torr, styrene vapour was introduced into the treatment vessel 10, as the reacting gas of an organic compound, and the pressure was adjusted to 1 Torr. A high frequency of 13.56 MHz was imposed between the electrodes 40 and 41, whereby a low temperature plasma of the styrene was generated. An inorganic colorant A, which had non-polar groups on its surface, was obtained by carrying out the treatment for 30 minutes with 50 W of imposed electric power.

As alternatives to the above process, CR-50 was treated similarly but with the styrene reactant gas being replaced by toluene, cyclohexane, and tetrahydrofuran, respectively, to obtain the inorganic colorants B~D. Also, the procedure for producing the inorganic colorant A was repeated except that the treating time was 30 seconds, whereby the inorganic colorant E was obtained.

Each of the inorganic colorant A-E as mentioned above and an inorganic colorant which had not been treated according to this invention, were dispersed, by using a water-soluble acrylic resin (which was an acrylic resin having an acid value 60 and a numberaveraged molecular weight 6000, solubilized by neutralizing the resin with dimethylethanolamine) as a vehicle, with a 200 ml desk top type of SG mill, according to the formulation which is shown in the under-presented Table 1, whereby the aqueous colorants-dispersed paste a-e and x were obtained.

Properties of the thus-obtained pastes a–e and x, in which the colorants were dispersed, were determined as described below and the results are shown in Table 1.

TABLE 1

| | | Colorant-dispersed paste a | Colorant-dispersed paste b | Colorant-dispersed paste c | Colorant-dispersed paste d | Colorant-dispersed paste e | Colorant-dispersed paste x |
|---|---|---|---|---|---|---|---|
| Component combined | Water-soluble resin | 6.5 | 6.5 | 6.5 | 6.5 | 6.5 | 6.5 |
| | Deionized water | 48.5 | 48.5 | 48.5 | 48.5 | 48.5 | 48.5 |
| | Inorganic colorant | Colorant A: 45 | Colorant B: 45 | Colorant C: 45 | Colorant D: 45 | Colorant E: 45 | Colorant not yet treated: 45 |
| | Condition for plasma treatment | Styrene 50 W 30 min. | Toluene 50 W 30 min. | Cyclohexane 50 W 30 min. | THF 50 W 30 min. | Styrene 50 W 30 sec. | — — — |
| Gloss (60°) | | 80 | 82 | 80 | 77 | 53 | 50 |
| Yield value (dyne/cm$^1$) | | 3 | 2 | 4 | 5 | 20 | 23 |

In Table, the numerical value of component combined shows a part by weight.

First, the colorant-containing dispersed pastes a–e and x were coated onto a glass plate by using a doctor blade. After drying, specular gloss at 60° was evaluated. In addition, a viscosity determination was carried out, and the yield value was obtained from the Casson's equation, using a viscosimeter of a corn-plate type (E type made by Tokyo Keiki Co., Ltd.) and changing the shear rate in a range of 1.92 to 384 sec$^{-1}$.

As seen from the above results, the pastes a to d, in which colorants were dispersed according to the examples of the present invention all have higher gloss and smaller yield value, which means better flow properties, when compared with the paste x in which a colorant, which had not been treated according to this invention, was dispersed. These data show that the effect of this invention was evidenced. Within the data for dispersed pastes a to d, the effect of the treatment in the dispersed paste e was poor, because the time during which the inorganic colorant E was treated was short. From these facts, it is preferred that imposing electric energy is 1 mWh/m$^2$ or more.

EXAMPLE 2

The pastes b and x obtained from said example 1, in which colorants were dispersed, were dissolved according to the formulation in the under-presented Table 2 by using as vehicles water-soluble acrylic resins which are the same as in the example 1 and a water-soluble melamine resin [Cymel-303 (registered trademark) made by Mitsui Toatsu Co., Ltd.], whereby the waterbased paints b' and x' were obtained. The paints, which were held at 40° C. for two (2) weeks were applied on a tinplate by using a doctor blade, allowed to stand for 30 minutes, and then baked at 150° C. for 20 minutes to get a paint film on the tinplates. The specular gloss of each of the paint films at 20° C. was measured. The results are shown in the following table 2.

Next, by using the same water-soluble acrylic resin used in the example 1, a carbon black (MA-100, made by Mitsubishi Chemical Co., Ltd.) and a water-soluble melamine resin [Cymel-303 (registered trademark) made by Mitsui Toatsu Co., Ltd.], a paint of black color was produced and mixed with said paints b' and x' that are white paints. The mixing proportion was set at 1 to 180 in weight ratio between the carbon black in the black paint and the titanium dioxide in the paints b' and x'.

These mixed paints were applied on a tinplate by a doctor blade and stood for 30 minutes, and a part of the coating film was rubbed with a finger (a rubbing test) and baked at 150° C. for 20 minutes.

For the thus-obtained, cured paint film, the color difference between the rubbed surface and the unrubbed surface (ΔE) was determined with a color and color difference meter (SM-4 type made by Suga Shikenki). The results which were obtained are shown in Table 2.

TABLE 2

| Sample examined | | Paint b' | Paint x' |
|---|---|---|---|
| Paint formulation | Water-soluble acrylic resin | 40 | 40 |
| | Water-soluble melamine | 22 | 22 |
| | Deionized water | 68 | 68 |
| | Dispersed paste b | 100 | — |
| | Dispersed paste x | — | 100 |
| Gloss (just after production) | | 80 | 71 |
| Gloss (after storage) | | 80 | 63 |
| Color difference (ΔE) | | 0.14 | 0.65 |

In Table, the paint formulation is shown by a part by weight.

As seen in the above results, when compared with the paint x', which contains the inorganic colorant B which had not been treated according to this invention, the paint b' in the example of this invention shows higher gloss and, even after storage, there is no observable decrease in gloss, so that the superiority in storage stability of the paints made according to this invention has been proved. Also, as a result of the rubbing test for the mixed paint, it was proved that paint made from an inorganic colorant which was coated according to this invention, had a substantially smaller color difference and was shown to be substantially superior in stability against flooding.

EXAMPLE 3

Except that the treating time was 3 hours, the treating process for the inorganic colorant A in said example 1, was repeated but octafluorocyclobutane was used as the reacting gas, whereby the inorganic colorant F was obtained.

According to the formulation in the following table 3, the inorganic colorant F and the inorganic colorant which was not treated according to this invention were dispersed in a fluorine-containing resin, that is a nonpolar resin (Lumifuron LF-100 made by Asahi Glass Co., Ltd.). Pastes f and y, respectively, in which these inorganic colorants were dispersed, were obtained. In this dispersion process, a grind gauge test was carried out on the dispersion of the paste dispersed with the colorant, and, until the reading (ISO 1524) became 10

μm or less, the dispersion process was continued, and the time required for the dispersion process to achieve these results was determined. The results obtained are shown in the following Table 3.

TABLE 3

| Sample tested | | Paste f | Paste y |
|---|---|---|---|
| Paste formulation | Fluororesin | 40 | 40 |
| | Xylene | 30 | 30 |
| | Inorganic colorant F | 50 | — |
| | Colorant not yet treated | — | 50 |
| Dispersing time (minutes) | | 90 | 180 |

In Table, the numerical value of paste formulation is a part by weight.

As seen from the above results, when the paste f, which is an example of this invention in which a colorant being dispersed, is compared with the paste in which a colorant which had not been treated according to this invention was used, it is seen that the dispersing time was one-half, and the dispersing rate was faster. This means that the dispersibility was better. This is due to the fact of that the affinity of the inorganic colorant F for the non-polar fluorine resin, when compared with the colorant which had not been treated according to this invention and therefore had a surface of high polarity, is much better.

According to the present invention, a surface of an inorganic colorant can be transformed into a non-polar state, or its polarity can be much reduced by forming thereon a non-polar group, obtainable from low temperature plasma polymerization of an organic compound. Since stabilization of the colorant particles due to a hydrophobic interaction is more easily attained, the dispersibility in water-soluble materials is increased. As a result, in various uses in which very good dispersibility of the inorganic colorant into the dispersion medium is required, different kinds of performance which are affected by the dispersibility are improved. For example, in pastes or paints in which the inorganic colorant of this invention has been dispersed, various kinds of performance, such as gloss, storage stability, and stability against flooding and floating are improved.

In particular, the performance of a water-based paint and a neutral or a non-polar resin paint, which have hitherto been inferior in performance because of the bad dispersibility of their inorganic colorant, can be greatly increased, so that great contribution for use of these paints and for expansion of their demand can be expected.

Because the treatment according to this invention, for increasing the dispersibility of an inorganic colorant, is relatively simple in operation and has a high treating efficiency, such low temperature plasma polymerization of an organic compound onto the surface of an inorganic colorant is one of high efficiency, and the production cost is low. Further, since there is no case where treating is impossible or where the treating conditions change greatly, a wide variety of inorganic colorant species is available, and the dispersibility thereof can be easily increased in any kind of inorganic colorant composition.

Also, the treated inorganic colorant of the present invention has an improving effect on its dispersibility not only in a dispersion medium composed of a specially defined compound, but also in substantially any selected dispersing medium as long as it is a water-soluble medium or a non-polar dispersion medium. Therefore, the variety applicable dispersion media is great.

What is claimed is:

1. In a paint comprising:
   water,
   a resin, having a neutralized acidic or basic functional group, dissolved in said water, as a vehicle for said paint and
   particles of at least one inorganic colorant which has surface hydroxyl groups and, as a consequence, a high surface polarity, dispersed in said water in which said resin is dissolved;
   the improvement, whereby reducing the free energy at an interface between said inorganic colorant particles and said resin, which comprises:
   the surface of high polarity of said inorganic colorant particles being at least partially covered with a coating consisting essentially of an amount of a non-polar crosslinked organic polymer sufficient to form enough of a nonpolar surface on the surface of said colorant particles to reduce the polarity of the surface of said inorganic colorant particles, to increase the affinity of said thus covered inorganic colorant particle surface to said resin, and to thereby increase the dispersibility of said covered inorganic colorant particles in said water in which said resin is dissolved;
   said surface covering having been achieved by subjecting said inorganic colorant particles to low temperature plasma polymerization of a polymerizable organic compound under conditions sufficient to at least partially cover the surface thereof, which has high polarity, with said crosslinked polymer.

2. A paint as claimed in claim 1 wherein said inorganic colorant is at least one member selected from the group consisting of $TiO_2$, ZnO, $SiO_2$, $Al_2O_3$, $Fe_2O$, FeO, $Fe_2O_3$, Al, Cu and Zn.

3. A paint as claimed in claim 1 wherein said crosslinked organic polymer is at least one member selected from the group consisting of styrene, benzene, toluene, xylene, cyclohexane, cyclobutane, octafluorocyclobutane, and tetrahydrofuran.

4. A paint as claimed in claim 1 wherein said coated inorganic colorant has a lower heat of immersion in water as compared to the heat of immersion in water of said inorganic colorant prior to the low temperature plasma coating thereof.

5. A paint as claimed in claim 1 wherein said low temperature plasma polymerization coating of said inorganic colorant is carried out at a low pressure of at least about 0.1 Torr.

6. A paint as claimed in claim 1 wherein said low temperature plasma polymerization coating of said inorganic colorant is carried out at a low pressure of about 0.1 to 10 Torr.

7. A paint as claimed in claim 1 wherein said low temperature plasma polymerization coating of said inorganic colorant is carried out at a low pressure of about 0.1 to 3 Torr.

* * * * *